(12) United States Patent
Barthelme et al.

(10) Patent No.: US 9,939,023 B2
(45) Date of Patent: Apr. 10, 2018

(54) BEARING ASSEMBLY HAVING A ROLLER BEARING CONNECTED TO A BEARING SUPPORT BY AFFIXING PLATES AND A SPRING ELEMENT DISPOSED BETWEEN AN AFFIXING PLATE AND BEARING SUPPORT

(71) Applicant: AKTIEBOLAGET SKF, Göteborg (SE)

(72) Inventors: Jürgen Barthelme, Frankenwinheim (DE); Alexander Dilje, Schweinfurt (DE); Helmut Hauck, Euerbach (DE); Daniel Ludwig, Gochsheim (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 46 days.

(21) Appl. No.: 15/033,465

(22) PCT Filed: Oct. 29, 2014

(86) PCT No.: PCT/EP2014/073241
§ 371 (c)(1),
(2) Date: Apr. 29, 2016

(87) PCT Pub. No.: WO2015/063165
PCT Pub. Date: May 7, 2015

(65) Prior Publication Data
US 2016/0252135 A1    Sep. 1, 2016

(30) Foreign Application Priority Data

Oct. 30, 2013    (DE) .................... 10 2013 222 050

(51) Int. Cl.
*F16C 35/06*    (2006.01)
*F16C 19/34*    (2006.01)
(Continued)

(52) U.S. Cl.
CPC .............. *F16C 35/06* (2013.01); *F16C 19/34* (2013.01); *F16C 35/042* (2013.01);
(Continued)

(58) Field of Classification Search
CPC ....... F16C 35/06; F16C 35/067; F16C 35/042
See application file for complete search history.

(56) References Cited

U.S. PATENT DOCUMENTS 1,944,291 A * 1/1934 Lundvall ............... F16C 35/067
384/517
2,762,666 A    9/1956 Potter
(Continued)

FOREIGN PATENT DOCUMENTS

CN    20044260938 U    8/2005
DE    965774 C    6/1957
(Continued)

*Primary Examiner* — Thomas R Hannon
(74) *Attorney, Agent, or Firm* — Bryan Peckjian; SKF USA Inc. Patent Dept.

(57) ABSTRACT

A bearing assembly includes a roller bearing connected with a plate-shaped bearing support. The bearing support has a receiving bore for an outer ring of the roller bearing, and the outer ring of the roller bearing is affixed to the bearing support with two affixing plates that are fixed to first and second end sides of the bearing support. The two affixing plates clamp the outer ring at two clamping surfaces. An axial spacing of the first and second end sides of the bearing support is smaller than an axial spacing of the clamping surfaces of the outer ring, and a spring element configured to act in the axial direction is disposed between one of the two affixing plates and the bearing support.

14 Claims, 1 Drawing Sheet

(51) Int. Cl.
  *F16C 35/067*  (2006.01)
  *F16C 35/04*   (2006.01)
  *F16C 19/06*   (2006.01)

(52) U.S. Cl.
  CPC ............ *F16C 35/067* (2013.01); *F16C 19/06* (2013.01); *F16C 2226/60* (2013.01)

(56) References Cited

U.S. PATENT DOCUMENTS

| | | | |
|---|---|---|---|
| 6,409,390 B1 * | 6/2002 | Bouzakis | F16C 19/54 |
| | | | 384/517 |
| 8,052,331 B2 | 11/2011 | Katougi et al. | |
| 8,790,016 B2 * | 7/2014 | Bitzl | F16C 19/54 |
| | | | 384/537 |
| 2004/0189124 A1 * | 9/2004 | Baudelocque | C12N 9/93 |
| | | | 310/90.5 |
| 2009/0001245 A1 | 1/2009 | Hirai et al. | |

FOREIGN PATENT DOCUMENTS

| | | | |
|---|---|---|---|
| DE | 1022429 B | 1/1958 | |
| DE | 1575609 A1 * | 1/1970 | ............ F16C 35/067 |
| DE | 60209752 T2 | 11/2006 | |
| DE | 10200704046 A1 | 2/2009 | |
| WO | 2008/116443 A1 | 10/2008 | |

\* cited by examiner

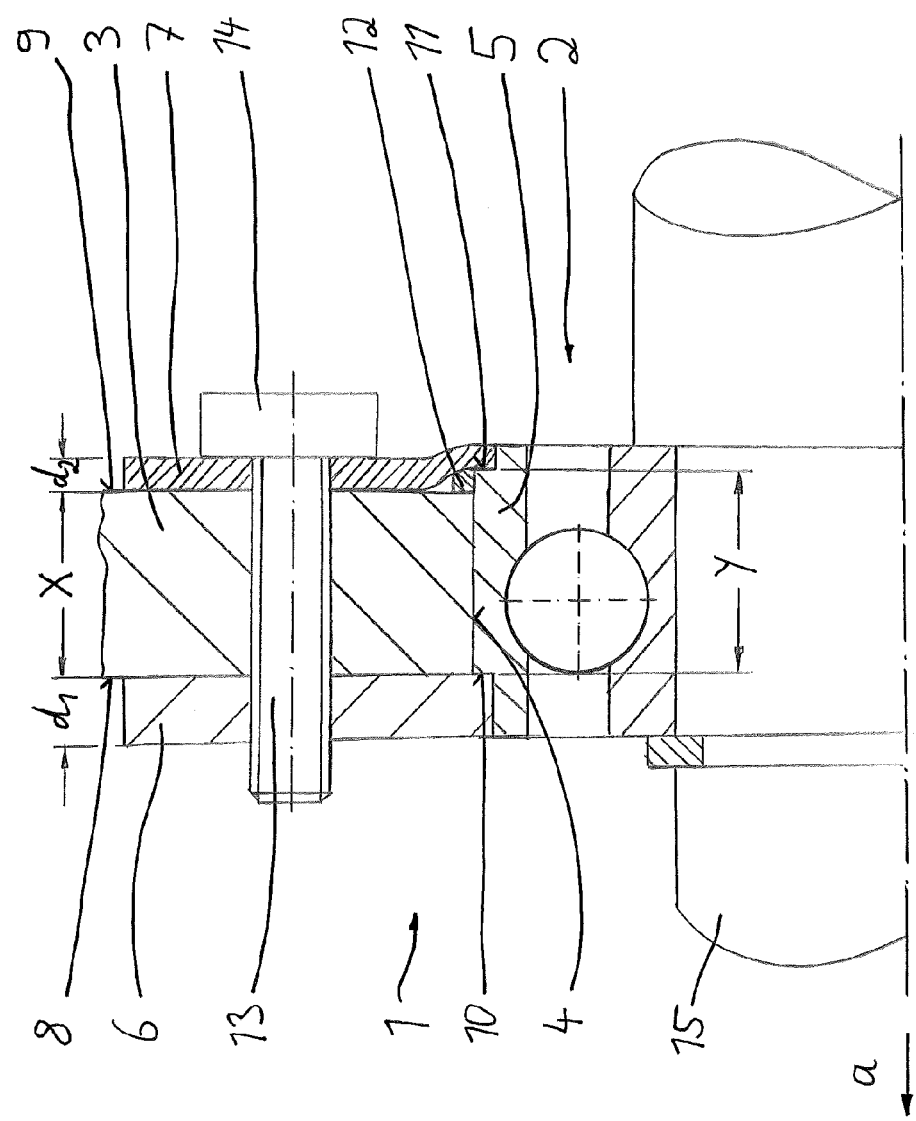

BEARING ASSEMBLY HAVING A ROLLER BEARING CONNECTED TO A BEARING SUPPORT BY AFFIXING PLATES AND A SPRING ELEMENT DISPOSED BETWEEN AN AFFIXING PLATE AND BEARING SUPPORT

CROSS-REFERENCE

This application is the U.S. National Stage of International Application No. PCT/EP2014/073241 filed on Oct. 29, 2014, which claims priority to German patent application no. 10 2013 222 050.2 filed on Oct. 30, 2013.

TECHNOLOGICAL FIELD

The disclosure is directed to a bearing assembly, comprising at least one roller bearing, which is connected with at least one bearing support that is formed plate-shaped at least in a section thereof. The bearing support has a receiving bore for the outer ring of the roller bearing, and the outer ring of the roller bearing is affixed to the bearing support with two affixing plates that are fixed at the two end sides of the bearing support. The two affixing plates clamp the outer ring at two clamping surfaces and the spacing, measured in the axial direction, of the end sides of the bearing support is smaller than the spacing, measured in the axial direction, of the clamping surfaces of the outer ring.

BACKGROUND

A bearing assembly of the above-mentioned type is disclosed in DE 602 09 752 T2 (family member of US 2004/0189124). DE 10 2007 040 460 A1, U.S. Pat. No. 8,052,331 B2, DE 10 22 429 A, DE 965 774 B and WO 2008/116443 A1 show similar solutions. In the first reference, a structure of a bearing assembly is proposed, in which the roller bearing to be retained in the bearing support and especially its outer ring is affixed to the bearing support with lateral affixing plates. The two affixing plates are affixed to the bearing support with bolts and fixedly clamp the bearing outer ring to the bearing support. The bearing outer ring is thereby supported on its both sides by the affixing plates; at the same time, the plates are supported on the two end-side surfaces of the plate-shaped bearing support.

So that a static over-determination of the axial retention of the outer ring does not occur, the cooperating surfaces must be exactly tailored to each other. If this is not the case, the bearing can axially migrate despite the two retaining plates, which is not acceptable, because then the axial position of the outer ring relative to the bearing support is not defined in a precise manner. During operation of the assembly, this leads to louder noises and increased wear as a consequence of the not-defined position of a transmission shaft supported by the roller bearing.

It is therefore disadvantageous in the above-described, known solutions that a very high manufacturing effort must be incurred, which makes the manufacture of the bearing support cost-intensive.

Solutions are also known, in which the roller bearing and/or its outer ring is affixed to the bearing support only via a single retaining plate. However, it is disadvantageous that the retention of the bearing on the bearing support is not as stable as in the above-described, known solutions.

SUMMARY

The object underlying the invention is to further develop a bearing support of the above-described type so that, in a simple and thus cost-effective manufacturing manner and for an applicable manufacturing tolerance that is thus present, a defined axial relative position between the outer ring and the bearing support is ensured.

The solution of this object by the invention provides that a spring element acting in the axial direction is disposed between one of the affixing plates and the bearing support.

The spring element can thus be formed in various ways. A first design provides that it is formed as an O-ring. Further, the spring element can be formed as a disk spring or disk spring assembly. Furthermore, the spring element can be formed from the material of one of the two affixing plates; in this case, a segment of the affixing plate can be formed spring-like in special way.

The spring element can be composed of metal, preferably spring steel. It can also be composed of plastic or rubber.

Preferably, the two affixing plates have a different mechanical strength.

The ratio of the spacing of the end sides of the bearing support to the spacing of the clamping surfaces of the outer ring preferably amounts to 0.90 and 0.995, particularly preferably between 0.975 and 0.995.

The two affixing plates can be affixed to the bearing support by bolts.

Preferably, one of the two affixing plates is captively connected with the outer ring of the roller bearing, wherein this affixing plate is preferably disposed in a groove in an end-side area of the outer ring.

With regard to the clamping surfaces of the bearing outer ring, by which the two affixing plates clamp the outer ring, it is noted that a preferable design provides that they are formed by grooves in the outer ring; then it involves the end-sided surfaces of said groove (this solution possibility is further explained in the following exemplary embodiment). However, it is also possible that such a groove is present only in an axial end area of the bearing ring and the affixing plate on the other axial end of the bearing outer ring clamps it on its end side, which is free of a groove. Finally, it is also possible to completely omit grooves in the bearing outer ring so that, in this case, the affixing plates abut on the end sides of the bearing outer ring and thereby clamp the outer ring.

In order to realize the above-mentioned differing mechanical strength of the two affixing plates, various possibilities are provided, of which some are embodied in the following; these can also be used in combination. The two affixing plates preferably have a different thickness—measured in the axial direction. They could have different sizes—observed from the axial direction. Furthermore, they could be composed of different materials. Further, the two affixing plates could each be composed of a plurality of plate elements that are disposed stacked on each other. In this case, the two affixing plates then have a different number of such plate elements.

In general, a different deformation behavior of the two affixing plates can be achieved by the above mentioned, and also by other, measures: Differing material strengths, a non-congruent design of the two affixing plates, differing thicknesses of the affixing plates, differing reinforcement elements in the affixing plates, a differing number of individual elements, from which the affixing plates are constructed (e.g., a plurality of different layers of thin sheets), could be provided, so that a different elasto-plastic behavior of the affixing plates is achieved overall in the axial direction. It is important insofar merely that, at least in sections of the affixing plates, different mechanical strengths are present.

In this regard, preferably it is the affixing plate having the greater mechanical strength that is captively connected with the outer ring of the roller bearing.

Finally, it can be provided that the bolt head of the bolts is disposed on the affixing plate having the lower mechanical strength.

The bearing support described here as plate-shaped can also be a segment of a wall of a housing, on which or in which the roller bearing is affixed.

The present proposal thus solves the problem of the static over-determination in the affixing of the bearing outer ring on the bearing support, as explained above. A defined axial gap between the affixing plates and the bearing support is provided, which is eliminated upon tightening the affixing bolts, and a spring element acting in the axial direction is disposed between the affixing plates and the bearing support.

This has the consequence that, upon tightening the affixing bolts, the bearing outer ring is tightened against a reference structure in an intentional manner, which reference structure is defined by the side of the bearing assembly, on which no spring element is disposed. Here, an affixing plate is preferably provided that is stiffer than the other, on which the spring element is provided.

Thus, a static over-determination of the axial bearing fixation can be eliminated in an advantageous manner, wherefore no extremely high manufacturing precisions are necessary, as is the case in the known solutions described in the introduction.

The small manufacturing tolerances, insofar as previously required, at the retaining plates as well as at the bearing outer ring and at the bearing support or wall of the housing are also not necessary, which makes possible a cost-effective manufacturing.

Further, the rejection rate can thus be reduced.

BRIEF DESCRIPTION OF THE DRAWINGS

An exemplary embodiment of the invention is illustrated in the drawing. The sole FIGURE shows the radial cross-section through a bearing assembly, wherein a roller bearing is held by a bearing support.

DETAILED DESCRIPTION

A bearing assembly 1 is illustrated in the FIGURE, which comprises a roller bearing 2 that is to be affixed in a bearing support 3. The final mounted state is illustrated, after which the bolts 12, of which only one is illustrated, are tightened.

The illustrated bearing support 3 has at least the illustrated section, which is formed plate-shaped, with two end sides 8 and 9 that have a spacing X from each other in the axial direction a. The bearing support 3 can be a component that is fitted into a transmission housing; however it can also be a segment of a housing, e.g., of a transmission.

The bearing support 3 has a receiving bore 4 for receiving the outer ring 5 of the roller bearing 2. The outer ring 5 of the roller bearing 2 is pushed into the receiving bore and axially fixed by affixing an affixing plate 6 and 7 to each of the two end sides 8, 9 of the bearing support 3.

Clamping surfaces 10 and 11 are formed on the outer ring 5 in the area of the two end sides of the outer ring 5, which clamping surfaces 10, 11 can be formed—as illustrated—by grooves in the outer ring 5.

It is important that the spacing X, measured in the axial direction a, of the end sides 8 and 9 of the bearing support 3 is smaller than the spacing Y, measured in the axial direction a, of the clamping surfaces 10 and 11 of the outer ring 5. Further, as an important feature, it is provided that a spring element 12 is disposed between one of the affixing plates—namely the right affixing plate 7—and the bearing support 3; it is emphasized here that only a single spring element 12 is provided.

The spring element 12 is only schematically illustrated in the FIGURE; a variety of embodiments therefore are conceivable.

If the bolts 13 are inserted into the corresponding through-bores of the bearing support 3 and tightened (the mating thread for the bolts 13 is located in the left affixing plate 6), the composite composed of the outer ring 5, bearing support 3 and affixing plates 6, 7, including the spring element 12, is secured and the roller bearing 2 is thus attached to the bearing support 3.

In that this is possible in a problem-free manner in a statically determined manner and in the presence of manufacturing tolerances, the above-described embodiment is provided, i.e. that the spacing X, measured in the axial direction a, of the end sides 8 and 9 of the bearing support 3 is smaller than the spacing Y, measured in the axial direction a, of the clamping surfaces 10 and 11 of the outer ring 5. Accordingly, an axial gap is initially present—before the tightening of the bolts 13 (not illustrated)—between the end side 9 and the abutment surface of the affixing plate 7 on the bearing support 3.

In that now a defined axial position of the outer ring 5 relative to the bearing support 3 results upon firmly tightening the bolts 13, the spring element 12 is provided. Upon tightening of the bolts 13, it acts such that manufacturing-necessitated tolerances are equalized by a greater- or lesser-sized deformation of the spring element 12 as well as the radially-inner-lying area of the right affixing plate 7, so that the outer ring 5 abuts with the clamping surface 10 on the left affixing plate 6, so that the relative position between the outer ring 5 and the bearing support 3 is defined.

This procedure would be improved by forming the two affixing plates 6 and 7 differently and thus having a different mechanical strength. In this context, reference is made to the fact that the thickness $d_1$ of the left affixing plate 6 is larger than the thickness $d_2$ of the right affixing plate 7, so that the above-mentioned effect can be generated in an intentional manner; deformations occur primarily at the right affixing plate 7 so that the definition of the relative position between the outer ring 5 and the bearing support is provided by the left affixing plate 6. Upon tightening the bolts 13, the affixing plate 7 having the lower mechanical strength thus yields more than the other affixing plate 6, so that the final position of the outer ring 5 relative to the bearing support 3 is defined by the mechanically stronger affixing plate 6.

In the illustrated exemplary embodiment, it is—as was explained above—the right affixing plate 7 that has a lesser mechanical strength as compared to the left affixing plate 6. Accordingly, the left affixing plate 6 defines the relative position of the outer ring 5 to the bearing support 3; the right bearing plate 7 yields accordingly (which is shown in an exaggerated manner in the FIGURE) upon tightening of the bolts 13, which occurs through plastic and/or elastic deformation.

The smaller thickness $d_2$ thus preferably amounts to at most 75%, preferably at most 60%, of the larger thickness $d_1$.

A reliable securing of the assembly is possible while eliminating the to-be-expected manufacturing tolerances when the ratio of the spacing X of the end sides 8 and 9 of the bearing support 3 to the spacing Y of the clamping surfaces 10 and 11 of the outer rings 5 amounts to between 0.90 and 0.995, which is selected in accordance with the dimensions of the spring element 12. Then it is possible, without expensive measures, to affix the necessary components and nevertheless to ensure in the assembly that a defined position of the outer ring 5 relative to the bearing support 3 is present when the mounting process is concluded.

In the exemplary embodiment, it is provided that the thicker and thus stiffer affixing plate 6 is connected with the roller bearing 2 in a captive-manner. This can be effected by forming the grooves in the left end-side area of the outer ring 5 so that the affixing plate 6 snaps onto the outer ring 5 when axially slid and thus (up to a corresponding removing force) is firmly connected with the outer ring 5.

Further, it is provided that the bolt head 14 of the bolts 13 abuts on the affixing plate 7 having the lower mechanical strength.

Manufacturing tolerances play no large role more due to the initially—before the tightening of the bolts—present axial gap; these tolerances are compensated and/or absorbed upon tightening the bolts 13 and are specifically eliminated by elastic or also plastic deformation of the affixing plates 6, 7 and naturally of the spring element 12.

When the bearing assembly is mounted, e.g., in a transmission, the roller bearing 2 having the affixing plate 6 captively disposed on it is preferably initially pressed onto the shaft 15 (as illustrated in the FIGURE) and axially fixed. The receiving bore 4 of the bearing support 3 is brought over the outer ring 5 of the roller bearing 2 and is mounted. At this time, the pre-mounted affixing plate 6 contacts the end side 8 of the bearing support 3 in a flush manner so that no axial gap is present here between the affixing plate 6 and the end side 8 of the bearing support 3.

Then the annular-formed spring element 12 is set on the end side 9 of the bearing support 3 and subsequently the second affixing plate 7 is set into the corresponding groove in the outer ring 5, wherein the axial gap then initially results. Then the bolts 13 are screwed into the assembly and so that the bolt head 14 abuts on the end side of the mechanically weaker affixing plate 7 (as illustrated in the FIGURE).

By tightening the bolts 13, a first axial pre-stressing initially builds up as a consequence of the spring element 12. This occurs until the affixing plate 7 abuts on the end side 9 of the bearing support 3 in a gap-free manner after corresponding tightening of the bolts 13. By further tightening the bolts 13, a further elasto-plastic deformation of the spring element 12 occurs, so that tolerances can be compensated.

Upon simultaneously tightening all of the bolts 13, the fixed composite of the bearing assembly thus results through an elasto-plastic deformation, primarily of the affixing plate 7 having the lesser stiffness, as well as through elastic, if necessary also plastic, yielding of the spring element 12. An advantageous pre-stressing in the axial direction results from the elastic portion of the effect of the compression of the spring element 12. Accordingly, the position of the outer ring 5 relative to the bearing support 3 remains defined by the affixing plate 6.

REFERENCE NUMBER LIST

1 Bearing assembly
2 Roller bearing
3 Bearing support
4 Receiving bore
5 Outer ring
6 Affixing plate
7 Affixing plate
8 End side
9 End side
10 Clamping surface
11 Clamping surface
12 Spring element
13 Bolt
14 Bolt head
15 Shaft
a Axial direction
X Spacing of the end sides
Y Spacing of the clamping surfaces
$d_1$ Thickness
$d_2$ Thickness

The invention claimed is:

1. A bearing assembly comprising at least one roller bearing connected with at least one bearing support that is plate-shaped at least in a section, wherein the bearing support has a receiving bore for an outer ring of the roller bearing, wherein the outer ring of the roller bearing is affixed to the bearing support with two affixing plates that are fixed to first and second end sides of the bearing support, wherein the two affixing plates clamp the outer ring at two clamping surfaces, wherein a spacing (X), measured in an axial direction (a), of the first and second end sides of the bearing support is smaller than a spacing (Y), measured in the axial direction (a), of the clamping surfaces of the outer ring,
and wherein a spring element configured to act in the axial direction (a) is disposed between one of the two affixing plates and the bearing support.

2. The bearing assembly according to claim 1, wherein the spring element is an O-ring.

3. The bearing assembly according to claim 1, wherein the spring element is a disk spring or a disk spring assembly.

4. The bearing assembly according to claim 1, wherein the spring element comprises a portion of one of the two affixing plates.

5. The bearing assembly according to claim 1, wherein the spring element is composed of spring steel.

6. The bearing assembly according to claim 1, wherein the spring element is composed of plastic or rubber.

7. The bearing assembly according to claim 1, wherein the two affixing plates have a different mechanical strength.

8. The bearing assembly according to claim 1, wherein a ratio of the spacing (X) of the first and second end sides of the bearing support to the spacing (Y) of the clamping surfaces of the outer ring is from 0.90 to 0.995.

9. The bearing assembly according to claim 1, wherein the two affixing plates are affixed to the bearing support by bolts.

10. The bearing assembly according to claim 1, wherein one of the two affixing plates is captively connected with the outer ring of the roller bearing and disposed in a groove in an end-side area of the outer ring.

11. The bearing assembly according to claim 1, wherein a ratio of the spacing (X) of the first and second end sides of the bearing support to the spacing (Y) of the clamping surfaces of the outer ring is from 0.975 to 0.995.

12. The bearing assembly according to claim 1,
wherein the spring element comprises a plastic O-ring or a rubber O-ring,
wherein the two affixing plates have a different mechanical strength,
wherein a ratio of the spacing (X) of the first and second end sides of the bearing support to the spacing (Y) of the clamping surfaces of the outer ring is from 0.90 to 0.995, wherein the two affixing plates are affixed to the bearing support by bolts, and wherein one of the two affixing plates is captively connected with the outer ring of the roller bearing and disposed in a groove in an end-side area of the outer ring.

13. A bearing assembly comprising:

a bearing support including a plate-shaped section and a receiving bore;

a roller bearing having an outer ring having first and second clamping surfaces;

first and second affixing plates fixing the first and second clamping surfaces of the roller bearing at the plate-shaped section of the bearing support; and a spring element disposed against the bearing support, and wherein an axial width of the plate-shaped section of the bearing support is less than an axial separation of the first and second clamping surfaces of the outer ring.

14. A bearing assembly comprising:

a bearing support including a plate-shaped section and a receiving bore;

a roller bearing having an outer ring having first and second clamping surfaces;

first and second affixing plates fixing the first and second clamping surfaces of the roller bearing at the plate-shaped section of the bearing support; and a spring element disposed between the first affixing plate and the bearing support, and wherein an axial width of the plate-shaped section of the bearing support is less than an axial separation of the first and second clamping surfaces of the outer ring.

* * * * *